(12) United States Patent
Duan

(10) Patent No.: US 7,623,874 B2
(45) Date of Patent: Nov. 24, 2009

(54) METHOD FOR PROCESSING REQUESTS FOR LOCATION

(75) Inventor: Xiaoqin Duan, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 528 days.

(21) Appl. No.: 11/488,444

(22) Filed: Jul. 17, 2006

(65) Prior Publication Data
US 2007/0173264 A1 Jul. 26, 2007

Related U.S. Application Data

(63) Continuation of application No. PCT/CN2005/000169, filed on Feb. 6, 2005.

(30) Foreign Application Priority Data

Feb. 11, 2004 (CN) .................. 2004 1 0004916

(51) Int. Cl.
*H04W 24/00* (2009.01)
(52) U.S. Cl. .................. 455/456.1; 455/433; 455/456.3
(58) Field of Classification Search ...... 455/456.1–457, 455/415, 410–411, 433, 428, 560, 440
See application file for complete search history.

(56) References Cited

U.S. PATENT DOCUMENTS

| | | |
|---|---|---|
| 2002/0097709 A1 | 7/2002 | Haumont et al. |
| 2004/0203914 A1* | 10/2004 | Kall et al. ................ 455/456.1 |
| 2005/0014485 A1* | 1/2005 | Kokkonen et al. .......... 455/411 |

FOREIGN PATENT DOCUMENTS

| CN | 1375176 A | 10/2002 |
|---|---|---|
| JP | 2001-108464 | 4/2001 |
| JP | 2001-224055 | 8/2001 |
| JP | 2001-309429 | 11/2001 |
| JP | 2003-235070 | 8/2003 |

(Continued)

OTHER PUBLICATIONS

Korean Office action dated Apr. 20, 2007, for corresonding Korean patent application.

(Continued)

*Primary Examiner*—Kamran Afshar
(74) *Attorney, Agent, or Firm*—Darby & Darby PC

(57) ABSTRACT

The present invention discloses a method for processing requests for location, which comprises: A target UE sending a request for location to the Location Service (LCS) system and asking the LCS system to provide a requestor with the location information of the target UE; the LCS system positioning the target UE, acquiring the location estimate of the target UE, and deciding whether it is needed to hide the real identity of the target UE, and if yes, the LCS system sending the pseudonym and location information of the target UE to the requestor; otherwise, the LCS system sending the real identity and location information of the target UE to the requestor. The invention makes it possible for the LCS system to decide whether to hide the real identity of the target UE according to the user's requirement, improving the flexibility of the location service. As the LCS system is able to hide the real identity of the target UE, the security of using the location service is enhanced.

20 Claims, 4 Drawing Sheets

FOREIGN PATENT DOCUMENTS

| | | |
|---|---|---|
| JP | 2004-517573 | 6/2004 |
| WO | WO 00/78066 A1 | 12/2000 |
| WO | WO 01/60083 A2 | 8/2001 |
| WO | WO 02/054814 A1 | 7/2002 |
| WO | WO 03/045099 A1 | 5/2003 |
| WO | WO 03/047293 A1 | 6/2003 |

OTHER PUBLICATIONS

3rd Generation Partnership Project:; Technical Specification Group Services and System Aspects; Technical Report, Enhanced support for User Privacy in location services; Release 5; 3GPP TR 23.871 vol. 5.0.0, (Jul. 2002), XP002319796.

Digital cellular telecommunications system (Phase 2+); Location Services (LCS); Functional description; Stage 2; (3GPP TS 03.721 version 7.10.0 Release 1998); ETSI TS 101 724 vol. 7.10.0, (Jun. 2002); XP014006569.

European Search Report dated Feb. 25, 2007, for EP 05706607.8, in the name of Huawei Technologies Co., Ltd.

European Office action dated Oct. 10, 2007, for EP 05706607.8, in the name of Huawei Technologies Co., Ltd.

English translation of Japanese Office action dated Feb. 3, 2009, for corresponding Japanese application 2006-549838, indicating relevance of listed references WO 03/045099 and JP 2005-510912 in this IDS.

English translation of claims in Japan Publication 2005-510912 (member of patent family of WO 03/045099 listed above).

* cited by examiner

# METHOD FOR PROCESSING REQUESTS FOR LOCATION

CROSS-REFERENCE TO RELATED PATENT APPLICATION

This application is a Continuation Application of International Application Number PCT/CN2005/000169, filed on Feb. 6, 2005, which claims priority of Chinese Patent Application Number 200410004916.0, filed on Feb. 11, 2004.

FIELD OF THE TECHNOLOGY

The present invention relates to positioning techniques for network equipment, and more particularly, to a method for processing requests for location.

BACKGROUND OF THE INVENTION

The location service (LCS) of a mobile communications network is to obtain the location of a target user's equipment (UE) with location techniques, wherein the target UE refers to a user terminal which is to be positioned in a mobile communications network and the location may be geographical information expressed in latitude and longitude or location data with reference to local streets. The location obtained by a mobile communications network may be offered to the target UE for the target UE's self-locating, or to the communications network itself for area-specific charging or operational maintenance, or to other application clients, for instance, agencies or individual, requesting the location of the target UE for value-added services. Therefore, the location service has wide applications in such fields as emergency rescue, vehicle navigation and intelligent traffic systems, job dispatch and team management, mobile-yellow-page query, and enhancement of network performance. In the $3^{rd}$ Generation Partner Project (3GPP), specifications on LCS as well as the operational mode, structure, state description, and message flow for implementing the LCS have been described.

FIG. 1 is a schematic diagram illustrating the logical structure for implementing the LCS. As shown in FIG. 1, a requestor 101 requests the location of a target UE 103 from a network 102 which contains an LCS system. The network 102 makes a validity authentication of the requestor 101 to check whether the target UE 103 permits providing the location of the target UE 103 for the requestor 101. If the requestor 101 passes the validity authentication by the network 102, the network 102 will accept the request initiated by the requestor 101 for the location of the target UE 103, locate the target UE 103, and provide the requestor 101 with the positioning result of the target UE 103; otherwise, the network 102 will reject the request initiated by the requestor 101 for the location of the target UE 103. For the purpose of description, the network containing an LCS system is hereinafter named an LCS system for short. Here, the request for location originated by the target UE may be a Location Service Invoke sent to a Mobile Switch Center (MSC)/MSC Server or an LCS MO-LR Invoke sent to a Serving General Packet Radio Service (GPRS) Support Node (SGSN); the requestor may be an LCS Client, a group of LCS Clients, the target UE itself, or any other terminal that is able to process the location information of the target UE.

Logical functionality for implementing the location service in an LCS system include a Gateway Mobile Location Center (GMLC), a Subscriber Data Storage Server, such as a Home Location Register/Home Subscriber Server (HLR/HSS), a Core Network (CN), and a Radio Access Network (RAN). The GMLC may further include a Requesting GMLC (R-GMLC), a Home GMLC (H-GMLC), and a Visited GMLC (V-GMLC). The R-GMLC is the GMLC for receiving the request for location of the target UE initiated by a requestor, The H-GMLC refers to the GMLC which the target UE belongs to, and the V-GMLC refers to the GMLC which currently serves the target UE, that is, the GMLC which is associated with the serving node of the target UE currently. The R-GMLC, the H-GMLC, and the V-GMLC may be integrated in the same physical entity, or may be in separate physical entities.

So far, a procedure of a Mobile Originating Location Request (MO-LR) has been defined in the 3GPP specifications. The MO-LR is a request initiated by a target UE for its own location from an LCS system. After positioning the target UE, the LCS system will return a positioning result to the target UE. Furthermore, based on the request of the target UE, the LCS system may provide the positioning result of the target UE for an external requestor. The requestor herein refers to an LCS client or other application client that is able to handle the location information of the target UE.

FIG. 2 is a flowchart for processing an MO-LR in the prior art. As shown in FIG. 2, the processing of an MO-LR comprises the steps of:

Step 201: A target UE sends a service request carrying the identity of the target UE to the CN via RAN, requesting to establish a radio signaling connection with an LCS system. Then the LCS system may initiate a procedure of authentication and ciphering for the target UE according to the identity of the target UE. If the target UE has been authenticated by the network containing the LCS system, continue with step 202; otherwise, reject the service request for establishing a radio signaling connection initiated by the target UE and terminate the current processing of the MO-LR.

Steps 202: The target UE sends a Location Service Invoke including an identity of the target UE to the CN via RAN, requesting the LCS system to position the target UE and return the positioning result to the target UE. The Location Service Invoke may further carry an identity of a requestor, requesting the LCS system to provide the location information of the target UE for the requestor. The Location Service Invoke may further carry a GMLC address designated by the target UE, requesting the CN to provide the location information of the target UE for the requestor via the GMLC corresponding to the GMLC address. if the Location Service Invoke carries no GMLC address, The CN will assign a GMLC for the Location Service Invoke according to the assigned GMLC address saved in the CN and provide the requestor with the location information of the target UE via the GMLC assigned by the CN. Wherein, the GMLC assigned by the CN is called V-GMLC.

Steps 203~205: After receiving the Location Service Invoke, the CN sends a Location Request carrying the identity of the target UE to the RAN. Upon receiving the Location Request, the RAN will position the target UE according to the identity of the target UE. If the RAN succeeds in positioning the target UE, it returns a Location Report including the location information of the target UE to the CN. After the CN receives the Location Report carrying the location information of the target UE, it determines whether the Location Service Invoke initiated by the target UE carries a GMLC address or not, and if yes, The CN will continue to decide whether the CN itself can directly access the GMLC which corresponds with the GMLC address. If the CN can directly access the GMLC, it will send a Subscriber Location Report of the target UE directly which carries the identity and location information of the target UE to the GMLC. Wherein the interaction between the V-GMLC and the GMLC as shown in FIG. 2, i.e., Steps 207 and 210, may be skipped; if the CN can not access the GMLC directly, it will assign a V-GMLC that can directly be accessed by itself, and send a Subscriber Location Report to the V-GMLC which includes the identity and location information of the target UE, the identity of the requestor, and the GMLC address carried in the Location Service Invoke, and then continue with Step 206. If the Location Service Invoke initiated by the target UE carries no GMLC address, the CN will assign a V-GMLC that can be directly accessed by the CN, send a Subscriber Location Report of the target UE to the V-GMLC which carries the target UE's identity, the location information of the target UE, and the requestor's identity, and then continue with Step 206. If the RAN fails to position the target UE, it will return a Location Report carrying a value of error cause to the CN, and go directly to Step 212, i.e., the CN sends an LCS MO-LR Return Result carrying the value of error causes to the target UE via RAN.

Step 206: After receiving the Location Report of the target UE, the V-GMLC decides whether it carries the address of the GMLC, and if it does, then go to Step 207; otherwise, the V-GMLC will determine whether it is able to access the requestor directly according to the identity of the requestor. If the V-GMLC can access the director directly, it will directly send a Location Information of the target UE which carries the identity and location information of the target UE to the requestor, wherein the interaction between the V-GMLC and the GMLC, i.e., Step 207 and Step 210, may be skipped; otherwise, the V-GMLC will assign a GMLC that can access the requestor according to the identity of the requestor, and then continue with Step 207.

Step 207: Based on the GMLC address, the V-GMLC sends an MO-LR Location Information which carries the identity of the target UE, the location information of the target UE, and the identity of the requestor to the GMLC. In LCS, an MO-LR Location Information sent to a GMLC, a Mobile Application Part (MAP) Subscriber Location Report or Subscriber Location Report sent to a V-GMLC, a Location Information sent to the requestor may be called a location report of the target UE in a general designation.

Step 208: After receiving the MO-LR Location Information of the target UE, the GMLC sends a Location Information of the target UE which carries the identity and location information of the target UE to the requestor according to the identity of the requestor.

Step 209: After receiving the Location Information of the target UE, according to the service requirement, the requestor makes a corresponding process of the target UE's location information and then returns a Location Information Ack of the target UE to the GMLC. If the Location Information of the target UE received by the requestor is from the V-GMLC, the requestor will directly return the Location Information Ack of the target UE to the V-GMLC.

Step 210: Upon receiving the Location Information Ack of the target UE, the GMLC returns an MO-LR Location Information Ack of the target UE to the V-GMLC. If the MO-LR Location Information received by the GMLC comes from the CN, the GMLC directly returns the CN a Subscriber Location Report Ack of the target UE.

Step 211: After receiving the MO-LR Location Information Ack of the target UE, the V-GMLC returns the CN a Subscriber Location Report Ack of the target UE.

Step 212: After receiving the Subscriber Location Report Ack, the CN sends the target UE an LCS MO-LR Return Result carrying the location information of the target UE via RAN, which informs the target UE that its location information has been provided for the appropriate requestor and notifies the target UE the processing result of the target UE's location information for the requestor.

If the requestor is able to process the location information of the target UE based on the service requirement, the Location Information Ack of the target UE that the requestor returns to the LCS system will include a success flag, and correspondingly, the LCS MO-LR Return Result which the LCS system sends to the target UE will carry a success flag and further include the requestor's process result of the target UE's location information; if the requestor cannot process the location information of the target UE according to the service requirement, the Location Information Ack of the target UE returned by the requestor to the LCS system will carry a failure flag, and correspondingly, the LCS MO-LR Return Result sent by the LCS system to the target UE will include a failure flag and may further carry a value of error cause. Here, the location information is for describing the location of the target UE. The location information transmitted among the entities in network side, e.g., the RAN, GMCL, V-GMLC, and CN, may not be processable for terminals e.g., requestors and UE. So when a network entity sends the location information of the target UE to a requestor, the entity may first make a transformation for the received location information. Thus the received location information is transformed into another form of location information which can be processed by the requestor, and the entity can subsequently send the transformed location information to the requestor.

As seen from the MO-LR procedure defined by the 3GPP specifications said above, if the target UE requests its own location to an LCS system and asks the LCS system to provide the location information of the target UE for a requestor, after positioning the target UE and obtaining the location estimate of the target UE, the LCS system will provide the location information of the target UE for the requestor according to the location estimate. As providing the requestor with the location information of the target UE, the LCS system simultaneously provides a real identity of the target UE to the requestor. The real identity is a kind of identity that is assigned to the target UE in a unified way by the mobile communications network and is able to uniquely identify the target UE, e.g., the Mobile Station International ISDN Number (MSISDN) or the International Mobile Subscriber Identity (IMSI). In practice, when a target UE requests an LCS system that provides a requestor with the location information of the target UE, for the sake of security and privacy, the target UE may hope the real identity of itself be concealed.

SUMMARY

In view of the above, the object of this invention is to provide a method for processing requests for location so as to improve the flexibility in users' making use of the LCS.

The technical solution in accordance with this invention is as follows:

A method for processing requests for location, the method comprises:

a target UE sending a request for location to a location service (LCS) system, and asking the LCS system to provide a requestor with the location information of the target UE; the LCS system positioning the target UE and obtaining the location information of the target UE; the LCS system determining whether the real identity of the target UE should be concealed, if yes, sending the location information and a pseudonym of the target UE to the requestor.

The step of determining whether the real identity of the target UE should be concealed may comprise: determining whether the request for location sent by the target UE carries a pseudonym designated by the target UE, if yes, sending the location information and pseudonym of the target UE to the requestor; otherwise, sending the requestor the real identity and location information of the target UE.

The step of determining whether the real identity of the target UE should be concealed may comprise: determining whether the request for location sent by the target UE carries a pseudonym indication, if yes, assigning a pseudonym for the target UE, and then sending the location information and pseudonym of the target UE to the requestor; otherwise, sending the requestor the real identity and location information of the target UE.

The step of determining whether the real identity of the target UE should be concealed may comprise: determining whether the request for location sent by the target UE carries a pseudonym designated by the target UE, if yes, sending the location information and pseudonym of the target UE to the requestor; otherwise, further deciding whether the request for location sent by the target UE carries a pseudonym indication; if the request for location carries a pseudonym indication, assigning a pseudonym for the target UE, and then sending the location information and pseudonym of the target UE to the requestor; if the request for location carries no pseudonym indication, sending the requestor the real identity and location information of the target UE.

The step of determining whether the real identity of the target UE should be concealed may comprise: determining whether the request for location sent by the target UE carries a pseudonym indication, if the request for location carries a pseudonym indication, assigning a pseudonym for the target UE, and then sending the location information and pseudonym of the target UE to the requestor; if the request for location carries no pseudonym indication, further deciding whether the request for location sent by the target UE carries a pseudonym designated by the target UE; if the request for location carries a pseudonym, sending the location information and pseudonym of the target UE to the requestor; if the request for location carries no pseudonym, sending the real identity and location information of the target UE to the requestor.

The step of determining whether the real identity of the target UE should be concealed may comprise: determining whether the requestor for receiving the target UE's location information should analyze the real identity of the target UE, if no, assigning a pseudonym for the target UE, and then sending the location information and the pseudonym of the target UE to the requestor; otherwise, sending the requestor the real identity and location information of the target UE.

In the above solution, the pseudonym may be assigned by a Home Gateway Mobile Location Centre (H-GMLC), a Visited Gateway Mobile Location Centre (V-GLMC), or a Gateway Mobile Location Centre GMLC which can access the requestor in the LCS system; alternatively, the pseudonym may be assigned by a H-GMLC, a V-GLMC, an entity of the LCS system, or a GMLC which can access the requestor after the H-GMLC, the V-GLMC, the entity of the LCS system, or the GMLC interacts with an entity of the LCS system; the entity of the LCS system may be a Pseudonym Mediation Device (PMD) or H-GMLC.

In accordance with the invention, when a target UE requests the location of itself to an LCS system and asks the LCS system to provide the location information of the target UE for a requestor, after acquiring the target UE's location estimate, the LCS system will decide whether to hide the real identity of the target UE or not while providing the requestor with the location information of the target UE according to the target UE's indication, and if yes, the LCS system will send the pseudonym and location information of the target UE to the requestor, otherwise, it will send the requestor the real identity and location information of the target UE, so that the LCS system is able to decide whether to hide the real identity of the target UE according to the subscriber's demand, and improve the flexibility of the LCS.

DETAILED DESCRIPTION OF PREFERRED EMBODIMENTS

The present invention is hereinafter described in detail with reference to the accompanying drawings.

In accordance with the invention, when the target UE requests its location to the LCS system and asks the LCS system to provide a requestor with the location information of the target UE, after acquiring the location estimate of the target UE, the LCS system decides whether to hide the real identity of the target UE according to the indication of the target UE while providing the requestor with the location information of the target UE, and if yes, the LCS system will send the requestor a pseudonym of the target UE as providing the requestor with the location information of the target UE, wherein the pseudonym may be set by the target UE, or assigned to the target UE by the LCS system Otherwise, the LCS system will provide the requestor with the real identity of the target UE while providing the target UE's location information for the requestor.

Pseudonym, an assumed identity of the target UE, is for hiding the real identity of the target UE from a requestor. The pseudonym may be an enciphered form of the target UE's real identity. For example, if the real identity of the target UE is enciphered by using the common key of the target UE's home network, the enciphered result will be a pseudonym of the target UE. In addition, a pseudonym may directly contain the address of network entities related to the pseudonym itself, e.g., the address of the Pseudonym Management Device (PMD) for assigning the pseudonym or the H-GMLC's address; and the pseudonym may also contain the address of the PMD or the H-GMLC indirectly. By the derivation of the pseudonym, the LCS system can obtain the address of network entities related to the pseudonym.

Figure 1:
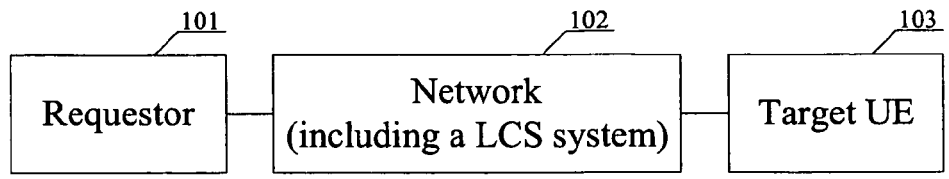
FIG. 1 is a schematic diagram illustrating the logical structure for implementing the location service.
Figure 2:
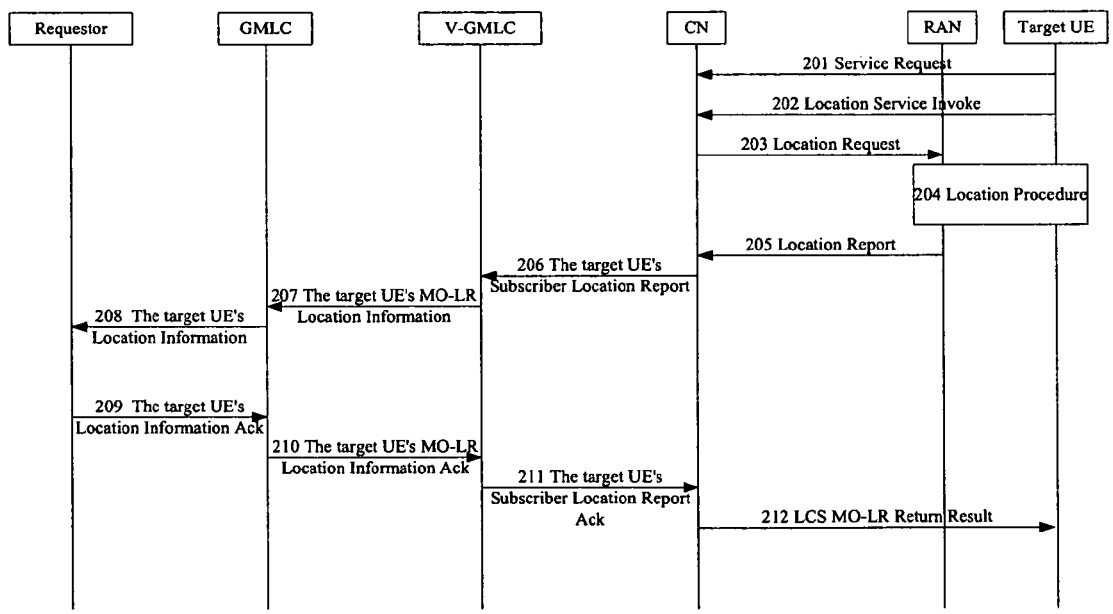
FIG. 2 is the flowchart for processing an MO-LR in the prior art.
Figure 3:
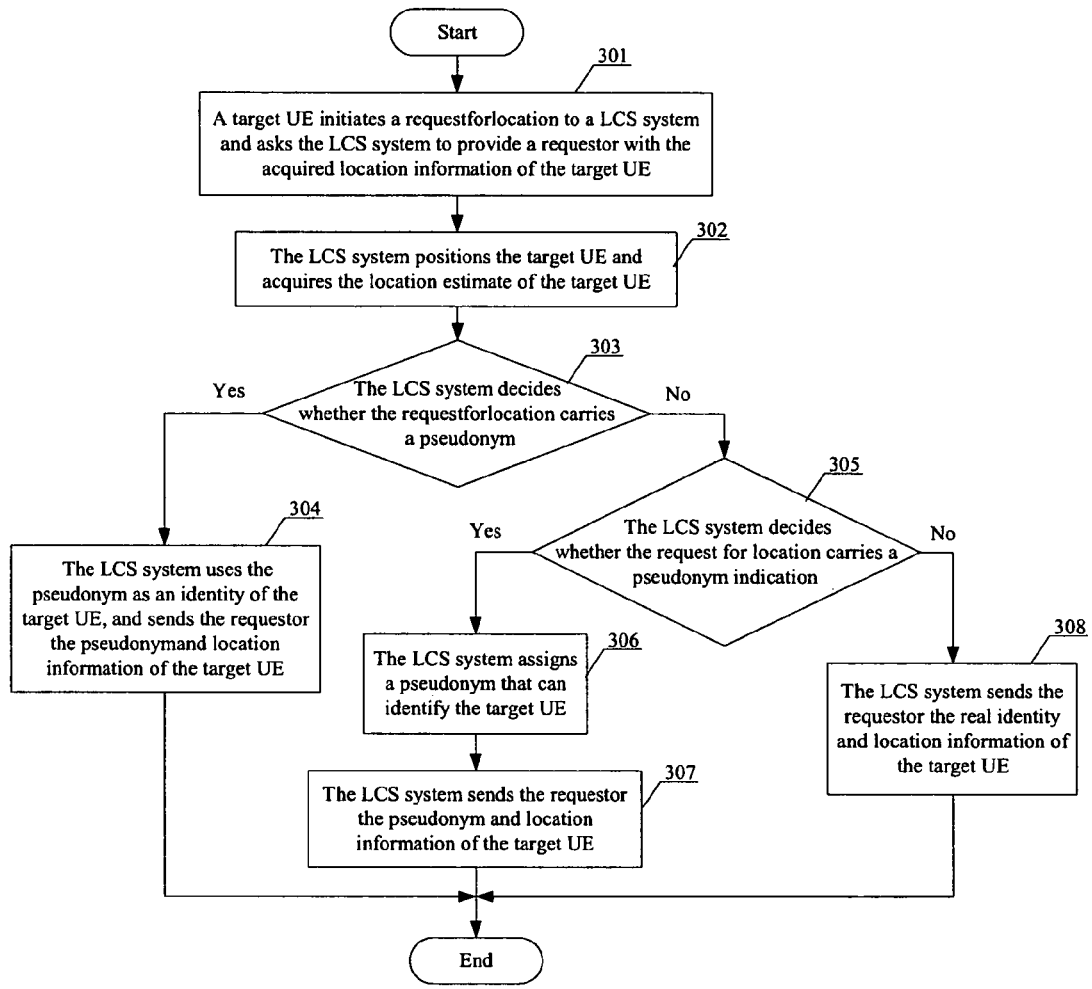
FIG. 3 is the flowchart for processing an MO-LR in accordance with an embodiment of the present invention.

FIG. 3 is the flowchart for processing an MO-LR in accordance with the present invention. As shown in FIG. 3, an MO-LR procedure comprises the following steps:

Steps 301~302: A target UE originates a request for location to the LCS system, requesting the LCS system to position the target UE and to provide a requestor with the location information of the target UE. The LCS system positions the target UE and obtains the location information of the target UE.

Step 303: The LCS system decides whether the request for location initiated by the target UE carries a pseudonym, and if yes, go to Step 304; otherwise, go to Step 305.

Step 304: The LCS system uses the pseudonym as an identity of the target UE, sends the requestor the pseudonym and the target UE's location information, and terminates the current MO-LR procedure.

Step 305: The LCS system decides whether the request for location initiated by the target UE carries a pseudonym indication, if yes, go to Step 306; otherwise, go to Step 308.

Steps 306~307: The LCS system assigns the target UE a pseudonym which can identify the target UE, then sends the pseudonym and location information of the target UE to the requestor, and terminates the current MO-LR procedure.

Step 308: The LCS system sends the requestor the location information of the target UE which includes the real identity of the target UE.

The above Step 303 and Step 305 may swap, i.e., after positioning the target UE and acquiring the location information of the target UE, the LCS system may first perform Step 305, i.e., and then decide whether the request for location originated by the target UE carries a pseudonym indication. If the request for location carries a pseudonym indication, go to Step 306; and if it carries no pseudonym indication, continue to decide whether the request for location originated by the target UE carries a pseudonym. If the request for location carries a pseudonym, go to Step 304; otherwise, go to Step 308. On the other hand, the above Step 303 and Step 304 may be skipped, i.e., after positioning the target UE and acquiring the location estimate, the LCS system may perform Step 305. That is, the LCS system decides whether the request for location originated by the target UE carries a pseudonym indication. If the request for location carries a pseudonym indication, go to Step 306; if it carries no pseudonym indication, go to Step 308.

In addition, when the LCS system makes a determination that the request for location originated by the target UE includes a pseudonym indication, in Steps 306-307, the LCS system may alternatively not assign the target UE a pseudonym that can identify the target UE. Instead, it may send the requestor only the location information of the target UE with neither the pseudonym nor the real identity of the target UE and then terminate the current MO-LR procedure. In the present invention, the LCS system may use another method to determine whether the real identity of the target UE should be concealed. The LCS system may determine whether the requestor for receiving the target UE's location information should analyze the real identity of the target UE, and if not, assign a pseudonym for the target UE, and then send the location information and the pseudonym of the target UE to the requestor. Otherwise, send the requestor the real identity and location information of the target UE.

Figure 4:
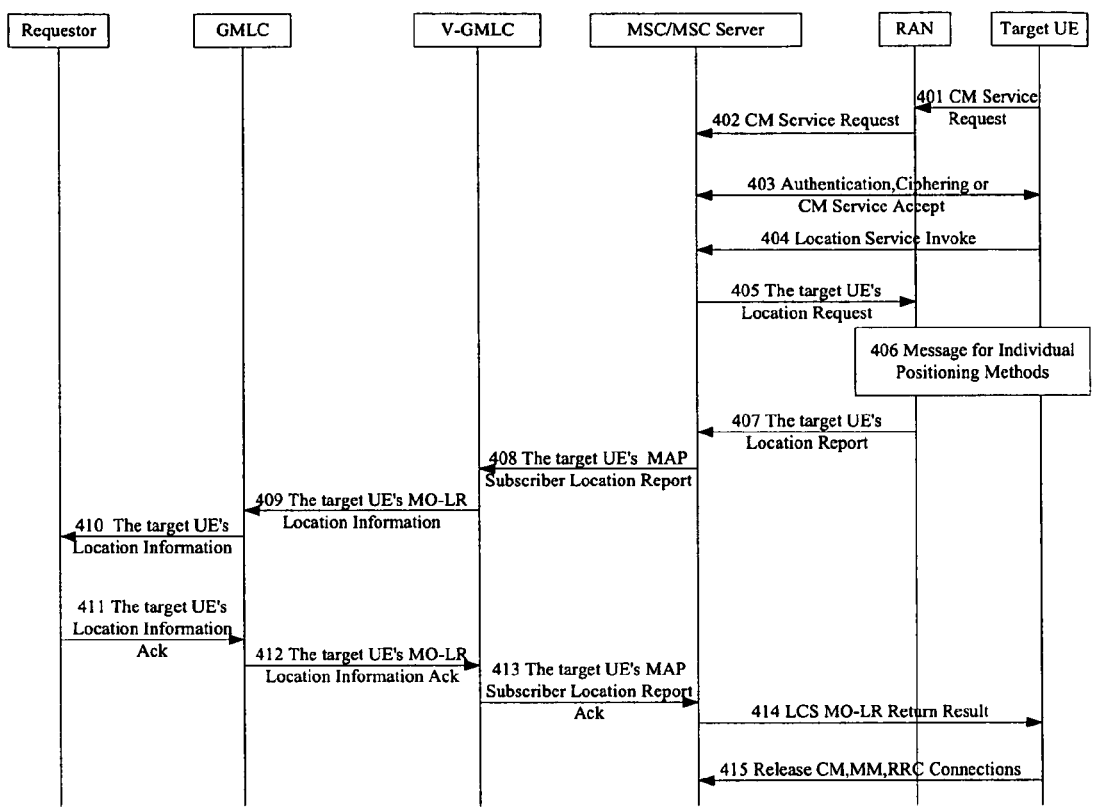
FIG. 4 is the flowchart of another embodiment in accordance with the present invention.

FIG. 4 is the flowchart of another embodiment of the present invention. As shown in FIG. 4, in the present embodiment, the procedure of an MO-LR carrying a requestor identity comprises the following steps:

Steps 401~403: The target UE sends a Call Management Service Request (CM Service Request) to the RAN, requesting to set up a radio signaling connection with the network. After receiving the CM Service Request, the RAN forwards the CM Service Request to an MSC/MSC Server. After receiving the CM Service Request, the MSC/MSC Server decides whether the target UE has subscribed to an MO-LR service initiated by the target UE according to the saved information, if the target UE has not subscribed to an MO-LR service, the MSC/MSC Server will return an LCS MO-LR positioning Result carrying a value of error cause to the target UE so as to reject the MO-LR service request originated by the target UE; if the target UE has subscribed to an MO-LR service, the MSC/MSC Server will interact with the target UE to complete the authentication and ciphering of the target UE; if the target UE has been authenticated, the MSC/MSC Server will notify the target UE that the initiated CM Service Request is accepted and continue with Step 404. If the target UE hasn't been authenticated, the MSC/MSC Server will notify the target UE that the initiated CM Service Request has been rejected.

Steps 404~405: After being authenticated by the MSC/MSC Server, the target UE sends a Location Service Invoke to the MSC/MSC Server, requesting the LCS system to position the target UE. The Location Service Invoke includes a pseudonym set by the target UE and a requestor identity, which asks the LCS system not to offer the requestor the real identity of the target UE, but to provide the pseudonym of the target UE for the requestor as providing the requestor with the target UE's location information. The Location Service Invoke may further carry a GMLC address designated by the target UE, asking the CN to provide the requestor with the location information of the target UE through the GMLC corresponding with the GMLC address. After receiving the Location Service Invoke, the MSC/MSC Server sends the RAN a Location Request for the target UE.

Step 406~407: After receiving the Location Request, the RAN positions the target UE to acquire the target UE's location estimate. If it succeeds in positioning the target UE, the RAN will return the MSC/MSC Server a Location Report carrying the target UE's location information. After it receives the Location Report including the target UE's location information, the MSC/MSC Server determines whether the Location Service Invoke initiated by the target UE carries a GMLC address, if it carries an address of a GMLC, continue to decide whether the MSC/MSC Server itself can access the GMLC directly which is corresponding to the GMLC address. If the MSC/MSC Server can access the GMLC directly, it will directly send the GMLC a Mobile Application Part (MAP) Subscriber Location Report carrying the pseudonym and location information of the target UE, wherein the interaction between the V-GMLC and the GMLC as shown in the figure, i.e., Step 409 and Step 412, may be skipped. If the MSC/MSC Server can not access the GMLC directly, the MSC/MSC Server will assign a V-GMLC that the MSC/MSC Server itself can directly access, send the V-GMLC an MAP Subscriber Location Report of the target UE which carries the target UE's pseudonym, the location information of the target UE, the requestor identity, and the GMLC address included in the Location Service Invoke, and continue with Step 408. If the Location Service Invoke originated by the target UE carries no GMLC address, the MSC/MSC Server will assign a V-GMLC that the MSC/MSC Server itself can access directly, send the V-GMLC an MAP Subscriber Location Report of the target UE which carries the target UE's pseudonym, the location information of the target UE, and the requestor identity, and continue with Step 408. If the RAN fails to position the target UE, it will return the MSC/MSC Server a Location Report including a value of error cause and go directly to Step 414, i.e., the MSC/MSC Server returns an LCS MO-LR Positioning Result carrying a value of error cause to the target UE via RAN.

Step 408: After receiving the MAP Subscriber Location Report of the target UE, the V-GMLC determines whether the MAP Subscriber Location Report carries a GMLC address, and if yes, go to Step 409; otherwise, the V-GMLC decides whether it can access the requestor directly based on the requestor identity. If the V-GMLC can access the requestor directly, it will send directly the requestor a Location Information of the target UE which carries the pseudonym and location information of the target UE, wherein the interaction between the V-GMLC and the GMLC as shown in the figure, i.e., Step 409 and Step 412, may be skipped. Otherwise, the V-GMLC will assign a GMLC that is able to access the requestor directly according to the requestor identity and continue with Step 409.

Step 409: The V-GMLC sends an MO-LR Location Information of the target UE to the GMLC according to the GMLC address which includes the target UE's pseudonym, the location information of the target UE, and the requestor identity.

Step 410: Upon receiving the MO-LR Location Information of the target UE, the GMLC sends the requestor the Location Information of the target UE which carries the pseudonym and location information of the target UE based on the requestor identity.

Steps 411~414 are basically the same as Steps 209~212.

Step 415: The target UE releases the occupied resources of the LCS system, i.e., releases the CM, MM, RRC Connection with the LCS system, and terminates the current MO-LR procedure of the circuit-switched domain.

Figure 5:
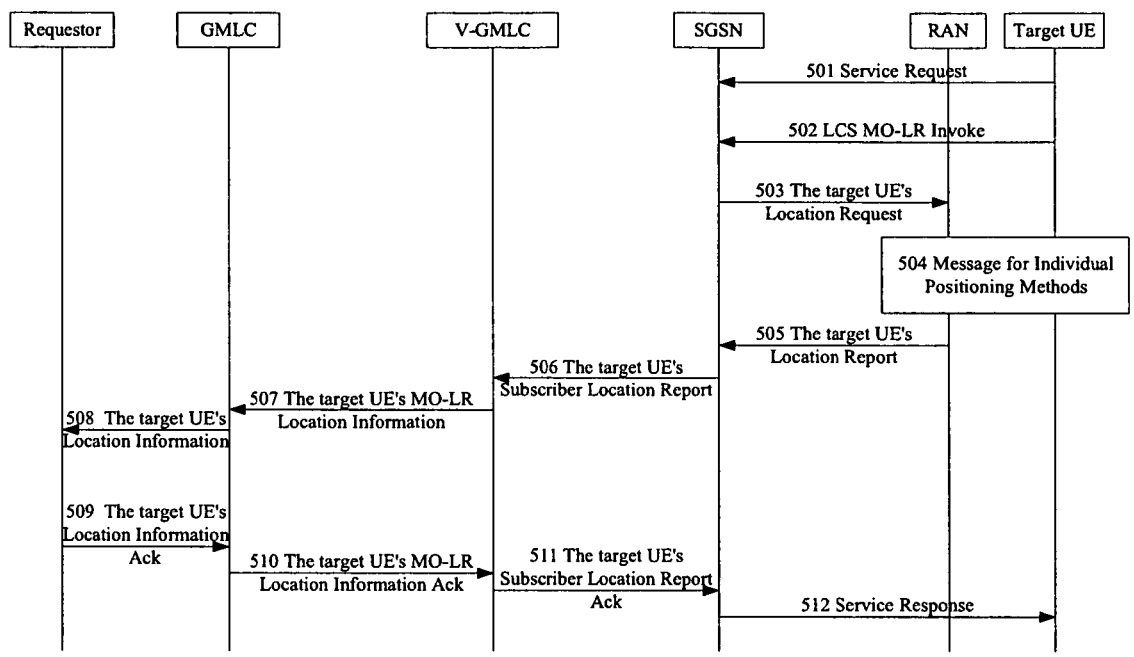
FIG. 5 is the flowchart of another embodiment in accordance with the present invention.

FIG. 5 is the flowchart of another embodiment of the present invention. As shown in FIG. 5, in the current embodiment, the procedure of an MO-LR carrying a requestor identity comprises the following steps:

Step 501: The target UE sends a Service Request to a SGSN, requesting to set up a radio signaling connection with the network. After receiving the Service Request, the SGSN sets up a signaling connection of Packet Switched (PS) domain with the target UE.

Step 502-503: The target UE sends an LCS MO-LR Invoke to the SGSN via RAN, requesting the LCS system to position the target UE. The LCS MO-LR Invoke carries a pseudonym indication and a requestor identity, asking that the LCS system should provide the requestor with the pseudonym for the target UE assigned by the LCS system rather than the target UE's real identity while the LCS system provides the requestor with the location information of the target UE. The Location Service Invoke may further carry a GMLC address designated by the target UE, requesting the SGSN to provide the requestor with the location information of the target UE via the GMLC corresponding with the GMLC address. After it receives the LCS MO-LR Invoke, the SGSN sends the RAN a Location Request for the target UE.

Step 504~505: After receiving the Location Request, the RAN positions the target UE and obtains the target UE's location estimate. If it succeeds in positioning the target UE, the RAN will return the SGSN a Location Report including the location information of the target UE. After receiving the Location Report, the SGSN decides whether the LCS MO-LR Invoke initiated by the target UE carries a GMLC address GMLC address, if it carries a GMLC address, the SGSN will continue to decide whether the SGSN itself can access the GMLC directly which is corresponding with the GMLC address. If it can access the GMLC directly, the SGSN will send a Subscriber Location Report to the GMLC directly which carries a pseudonym indication, the target UE's real identity, and the location information of the target UE, wherein the interaction between the V-GMLC and the GMLC as shown in the figure, i.e., Step 507 and Step 510, may be skipped. Otherwise, the SGSN will assign a directly accessible V-GMLC, send the V-GMLC a Subscriber Location Report of the target UE carrying the pseudonym indication, the real identity and location information of the target UE, the requestor identity, and the GMLC address included in the LCS MO-LR Invoke, and continue with Step 506. If the LCS MO-LR Invoke initiated by the target UE carries no GMLC address, the SGSN will assign a V-GMLC that the SGSN can access directly, send a Subscriber Location Report of the target UE to the V-GMLC which carries the target UE's pseudonym indication, the real identity and location information of the target UE, and the requestor identity, and continue with Step 506. If the RAN fails to position the target UE, it will return the SGSN a location report including a value of error cause and go straight to Step 512, i.e., the SGSN returns the target UE a Service Response carrying a value of error cause via RAN.

Step 506: Upon receiving the Subscriber Location Report of the target UE, based on the pseudonym indication and the target UE's real identity carried in the Subscriber Location Report, the V-GMLC decides whether the V-GMLC itself can assign a pseudonym for the target UE, and if it can assign the pseudonym, the V-GMLC will assign a pseudonym for the target UE according to the real identity of the target UE and continue with the subsequent procedure; if the V-GMLC can not assign a pseudonym for the target UE, the V-GMLC may interact with the HLR/HSS of the target UE to acquire the address of the target UE's H-GMLC and send the H-GMLC an MO-LR Location Information which carries a pseudonym indication and the real identity of the target UE, requesting the H-GMLC to assign a pseudonym for the target UE. After receiving the MO-LR Location Information, the H-GMLC assigns a pseudonym for the target UE according to the real identity thereof, or interacts with the PMD to request the PMD to assign a pseudonym for the target UE. Then, the H-GMLC returns the V-GMLC an MO-LR Location Information Ack which carries the pseudonym assigned for the target UE.

After acquiring the pseudonym of the target UE, the V-GMLC decides whether the received message contains the address of the GMLC, and if it contains the address, go to Step 507; if not, the V-GMLC continues to decide whether the requestor can be accessed directly according to the requestor identity. If the requestor can be accessed directly, the V-GMLC will send a Subscriber Location Report of target UE directly to the requestor which carries the pseudonym and location information of the target UE, wherein the interaction between the V-GMLC and the GMLC as shown in the figure, i.e., Step 507 and Step 510, may be skipped. Otherwise, the V-GMLC will assign a GMLC that can access the requestor according to the requestor identity and continue with Step 507.

Step 507: According to the GMLC address, the V-GMLC sends the GMLC the MO-LR Location Information of the target UE which includes the pseudonym and location information of the target UE and the requestor identity.

Step 508: After it receives the MO-LR Location Information of the target UE, the GMLC sends the requestor the target UE's Location Information including the pseudonym and location information of the target UE according to the requestor identity.

Steps 509~512 are basically the same as Steps 209~212.

In the above Step 506, the pseudonym of the target UE is assigned by the V-GMLC itself, or is obtained by the V-GMLC which requests the target UE's H-GMLC/PMD to assign the pseudonym. Alternatively, the V-GMLC may make no process of the target UE's pseudonym indication, instead, may send directly the MO-LR Location Information of the target UE to the GMLC which carries the pseudonym indication, the location information of the target UE and the requestor identity. Then, the GMLC will assign a pseudonym for the target UE according to the pseudonym indication and the target UE's real identity, or will possibly request the H-GMLC/PMD of the target UE to assign a pseudonym for the target UE and then send the requestor the Location Information of the target UE carrying the pseudonym and the target UE's location information.

In addition, it is mentioned in Steps 504~505 that, if the SGSN can access the GMLC, it will directly send a Subscriber Location Report of the target UE to the GMLC which includes the pseudonym indication, the real identity, and the location information of the target UE. In this case, after receiving the Subscriber Location Report of the target UE, the GMLC may also assign a pseudonym for the target UE according to the pseudonym indication and the target UE's real identity or may request the H-GMLC/PMD of the target UE to assign a pseudonym for the target UE, and then, the GMLC will send the requestor the Location Information of the target UE which carries the pseudonym and location information of the target UE.

In the second embodiment, the V-GMLC sends the MO-LR Location Information to the H-GMLC directly which carries the pseudonym indication and real identity of the target UE, requesting the H-GMLC to assign a pseudonym for the target UE, and then, the H-GMLC returns an MO-LR Location Information Ack to the V-GMLC which includes the pseudonym for the target UE assigned by the H-GMLC. Alternatively, the V-GMLC may send the H-GMLC the MO-LR Location Information which carries the pseudonym indication, the real identity and location information of the target UE, the requestor identity, and the possible GMLC address. Upon completing assigning a pseudonym for the target UE, the H-GMLC determines whether the MO-LR Location Information carries a GMLC address. If it carries the GMLC address, according to the GMLC address, the H-GMLC will send the GMLC the MO-LR Location Information including the target UE's pseudonym, the location information of the target UE, and the requestor identity. If the MO-LR Location Information carries no GMLC address, the H-GMLC will determine whether it is able to access the requestor immediately based on the requestor identity. If the H-GMLC is able to access the requestor immediately, it will send an MO-LR Location Information to the requestor which includes the pseudonym and location information of the target UE; otherwise, according to the requestor identity, the H-GMLC will assign the address of the accessible GMLC, and then send the GMLC an MO-LR Location Information carrying the target UE's pseudonym, the location information of the target UE, and the requestor identity. At last, the GMLC will send an MO-LR Location Information to the requestor which includes the pseudonym and location information of the target UE.

In the above embodiments, the pseudonym may be assigned by an H-GMLC, a V-GLMC, or a GMLC which can access the requestor in the LCS system. Alternatively, the pseudonym may be assigned by a H-GMLC, a V-GLMC, an entity of the LCS system, or a GMLC which can access the requestor after the H-GMLC, the V-GLMC, the entity of the LCS system, or the GMLC interacts with an entity of the LCS system. Here, the entity of the LCS system may be a PMD or H-GMLC.

In addition, in accordance with the above embodiments, it is efficiently realizable for network operators to protect the privacy of the subscriber's using of the service. The operator of the target UE's home network may sign an agreement with the visited network's operator of the target UE. The agreement requires that after the visited network of the target UE receives a request for location initiated by the target UE which is for asking the network to provide a requestor with the location information of the target UE, whereafter the visited network acquires the location information of the target UE.

The V-GMLC should not send an MO-LR Location Information of the target UE directly to the GMLC that can access the requestor; instead, it should send the MO-LR Location Information of the target UE to the H-GMLC which carries the GMLC address. Next, the H-GMLC should subsequently assign a pseudonym for the target UE, and at last send the requestor the pseudonym and location information of the target UE via the GMLC. In this way, the real identity of the target UE is hidden and the security of using the service is improved.

In the case of the target UE asking the LCS system to assign a pseudonym for the target UE itself, the LCS system may assign a pseudonym that is one-to-one corresponding to a real identity of the target UE based on the pre-stored information, e.g., the LCS system may assign a pseudonym that is acquired by enciphering a real identity of the target UE, and the target UE may register a corresponding service at a requestor with the pseudonym that is one-to-one corresponding to the target UE's real identity so as to hide the real identity thereof. Alternatively, in practical applications, it is possible that the requestor need not to recognize the pseudonym of the target UE upon receiving the target UE's pseudonym and location information. Thus the LCS system may assign a pseudonym randomly, that is, there is no fixed relationship of correspondence between the target UE and the pseudonym thereof. For example, the target UE may initiate a request for location, asking the LCS system to return the location information of the target UE in an electronic map format or a format of text. After positioning the target UE and acquiring the location estimate thereof, the LCS system may determine a requestor which has the ability of transforming any format into a format of electronic map or text said above based on the saved information of requestors' capabilities, and then send the pseudonym and location information of the target UE to the requestor. In this case, it is not needed for the requestor to decide whether the target UE has subscribed to the service according to the pseudonym of the target UE, so it will not be necessary for the requestor to recognize the pseudonym of the target UE. The requestor will directly convert the location information of the target UE according to the requirement, and then return the converted location information of the target UE to the LCS system. The LCS system will send the target UE the location information in an appropriate format of electronic map or text by means of Short Message Service (SMS), Multimedia Message Service (MMS), etc. In addition, in case that it is not needed for the requestor to make a process such as authenticating the user's identity included in the received location information of the target UE, the LCS system may not provide any identity of the target UE according to the pseudonym indication, but send the target UE's location information directly to the requestor.

To sum up, the foregoing is only preferred embodiments of the present invention and should not be construed as limiting the protection scope thereof.

The invention claimed is:

1. A method for processing requests for location, the method comprises:
   a location service (LCS) system receiving a request for location from a target user's equipment (UE), and to being requested to provide a requestor with the location information of the target UE;
   the LCS system positioning the target UE and obtaining the location information of the target UE; and
   the LCS system determining whether the real identity of the target UE should be concealed by
   (a) determining whether the request for location sent by the target UE carries a pseudonym designated by the target UE, if yes, sending the location information and a pseudonym of the target UE to the requestor; and (b) otherwise, send the requestor the real identity and location information of the target UE.

2. The method according to claim 1, wherein the step of sending the location information and a pseudonym of the target UE to the requestor comprises the steps of:

c1. On receiving the location information of the target UE acquired by the Radio Access Network (RAN), the Core Network (CN) in the LCS system deciding whether a GMLC address is carried in the request for location initiated by the target UE, if yes, performing Step c2; otherwise, performing Step c3;

c2. the CN sending a location report of the target UE to a GMLC according to the GMLC address which at least includes the location information of the target UE, the GMLC sending a location report of the target UE to the requestor which at least includes the location information and pseudonym of the target UE, and the current process of the method being terminated;

c3. the CN sending a location report of the target UE to a V-GMLC which at least includes the location information of the target UE, and the V-GMLC sending a location report to the requestor which at least includes the location information and pseudonym of the target UE.

3. The method according to claim 2, in Step c2, before the CN sending the location report of the target UE to the GMLC, further comprising:

the CN deciding whether the GMLC can be accessed directly according to the GMLC address, if yes, sending directly the location report of the target UE to the GMLC; otherwise, the CN sending the location report of the target UE to the V-GMLC, and the V-GMLC sending the location report of the target UE to the GMLC.

4. The method according to claim 2, wherein the request for location further comprises a requestor identity.

5. The method according to claim 4, before the V-GMLC sending the location report of the target UE to the requestor, further comprising:

deciding whether the requestor can be directly accessed according to the requestor identity, if yes, the V-GMLC sending the location report of the target UE to the requestor directly; otherwise, sending the location report of the target UE to a GMLC which is adapted to access the requestor, and the location report of the target UE being sent to the said requestor by the GMLC.

6. The method according to claim 2, wherein the location report further carries a pseudonym designated by the target UE, or a pseudonym indication.

7. The method according to claim 2, wherein the location report of the target UE is an MO-LR Location Information sent to the GMLC, or a Mobile Application Part (MAP) Subscriber Location Report or a Subscriber Location Report sent to the V-GMLC, or a Location Information sent to the requestor.

8. The method according to claim 1, wherein the step of sending the location information and a pseudonym of the target UE to the requestor comprises:

after receiving the location information of the target UE acquired by the RAN, the CN in the LCS system sending a location report of the target UE to a V-GMLC which at least carries the location information of the target UE, the V-GMLC sending the location report of the target UE to a H-GMLC, and the H-GMLC sending the requestor a location report of the target UE which at least includes the location information and pseudonym of the target UE.

9. The method according to claim 8, wherein the step of sending the requestor the location report of the target UE by the said H-GMLC comprises:

the H-GMLC determining whether a GMLC address is carried in the location report of the target UE, if yes, the H-GMLC sending the location report of the target UE to a GMLC which corresponds to the GMLC address, and the said GMLC sending the requestor the location report of the target UE; otherwise, according to the requestor identity, the H-GMLC further deciding whether the requestor can be accessed directly; if the requestor can be accessed directly, the H-GMLC sending directly the location report of the target UE to the requestor; if the requestor can not be accessed directly, the H-GMLC sending the location report of the target UE to a GMLC that can is adapted to access the requestor, and the GMLC sending the said requestor the location report of the target UE.

10. The method according to claim 8, before the H-GMLC sending the location report of the target UE to the requestor, further comprising:

the H-GMLC deciding whether the requestor can be accessed directly according to the requestor identity, if yes, sending directly the requestor the location report of the target UE; otherwise, sending the location report of the target UE to a GMLC that is adapted to access the requestor, and the GMLC sending the said requestor the location report of the target UE.

11. The method according to claim 8, wherein the location report of the target UE further carries a pseudonym designated by the target UE or a pseudonym indication.

12. The method according to claim 1, in the step of sending the location information and a pseudonym of the target UE to the requestor, after the LCS system sending the requestor the location information and pseudonym of the target UE, further comprising:

the requestor processing the received location information of the target UE and returning the processing result of the target UE's location information to the LCS system, and the LCS system returning the target UE the processing result of the target UE's location information.

13. The method according to claim 1, wherein the request for location originated by the target UE is a Location Service Invoke sent to a Mobile services Switching Centre (MSC)/MSC Server in the CN or an LCS Mobile Originating Location Request (MO-LR) Invoke sent to a Serving General Packet Radio Service Support Node (SGSN) in the CN; the said requestor is an LCS Client, a group of LCS Clients, or the target UE itself.

14. A method for processing requests for location, the method comprises:

a location service (LCS) system receiving a request for location from a target user's equipment (UE), and to being requested to provide a requestor with the location information of the target UE;

the LCS system positioning the target UE and obtaining the location information of the target UE; and the LCS system determining whether the real identity of the target UE should be concealed by (a) determining whether the request for location sent by the target UE carries a pseudonym indication, if yes, assigning a pseudonym for the target UE, and then sending the location information and pseudonym of the target UE to the requestor; and (b) otherwise, sending the requestor the real identity and location information of the target UE.

15. The method according to claim 14, wherein the pseudonym is assigned by a Home Gateway Mobile Location Centre (H-GMLC), a Visited Gateway Mobile Location Centre (V-GLMC), or a Gateway Mobile Location Centre GMLC which is adapted to access the requestor in the LCS system; alternatively, the said pseudonym is assigned by a H-GMLC, a V-GLMC, an entity of the LCS system, or a GMLC which is adapted to access the requestor after the H-GMLC, the V-GLMC, the entity of the LCS system, or the GMLC interacts with an entity of the LCS system; the said entity of the LCS system is a Pseudonym Mediation Device (PMD) or H-GMLC.

16. A method for processing requests for location, the method comprises:
  a location service (LCS) system receiving a request for location from a target user's equipment (UE), and to being requested to provide a requestor with the location information of the target UE;
  the LCS system positioning the target UE and obtaining the location information of the target UE; and
  the LCS system determining whether the real identity of the target UE should be concealed by
    (a) determining whether the request for location sent by the target UE carries a pseudonym designated by the target UE, if yes, sending the location information and pseudonym of the target UE to the requestor; and
    (b) otherwise, further deciding whether the request for location sent by the target UE carries a pseudonym indication; if the request for location carries a pseudonym indication, assigning a pseudonym for the target UE, and then sending the location information and pseudonym of the target UE to the requestor; if the request for location carries no pseudonym indication, sending the requestor the real identity and location information of the target UE.

17. The method according to claim 16, wherein the pseudonym is assigned by a Home Gateway Mobile Location Centre (H-GMLC), a Visited Gateway Mobile Location Centre (V-GLMC), or a Gateway Mobile Location Centre GMLC which is adapted to access the requestor in the LCS system; alternatively, the said pseudonym is assigned by a H-GMLC, a V-GLMC, an entity of the LCS system, or a GMLC which is adapted to access the requestor after the H-GMLC, the V-GLMC, the entity of the LCS system, or the GMLC interacts with an entity of the LCS system; the said entity of the LCS system is a Pseudonym Mediation Device (PMD) or H-GMLC.

18. A method for processing requests for location, the method comprises:
  a location service (LCS) system receiving a request for location from a target user's equipment (UE), and to being requested to provide a requestor with the location information of the target UE;
  the LCS system positioning the target UE and obtaining the location information of the target UE; and
  the LCS system determining whether the real identity of the target UE should be concealed by determining whether the request for location sent by the target UE carries a pseudonym indication, if the request for location carries a pseudonym indication, assigning a pseudonym for the target UE, and then sending the location information and pseudonym of the target UE to the requestor; if the request for location carries no pseudonym indication, further deciding whether the request for location sent by the target UE carries a pseudonym designated by the target UE; if the request for location carries a pseudonym, sending the location information and pseudonym of the target UE to the requestor; if the request for location carries no pseudonym, sending the real identity and location information of the target UE to the requestor.

19. The method according to claim 18, wherein the pseudonym is assigned by a Home Gateway Mobile Location Centre (H-GMLC), a Visited Gateway Mobile Location Centre (V-GLMC), or a Gateway Mobile Location Centre GMLC which is adapted to access the requestor in the LCS system; alternatively, the said pseudonym is assigned by a H-GMLC, a V-GLMC, an entity of the LCS system, or a GMLC which is adapted to access the requestor after the H-GMLC, the V-GLMC, the entity of the LCS system, or the GMLC interacts with an entity of the LCS system; the said entity of the LCS system is a Pseudonym Mediation Device (PMD) or H-GMLC.

20. A method for processing requests for location, the method comprises:
  a location service (LCS) system receiving a request for location from a target user's equipment (UE), and to being requested to provide a requestor with the location information of the target UE;
  the LCS system positioning the target UE and obtaining the location information of the target UE; and
  the LCS system determining whether the real identity of the target UE should be concealed by determining whether the requestor for receiving the target UE's location information should analyze the real identity of the target UE, if no, assigning a pseudonym for the target UE, and then sending the location information and the pseudonym of the target UE to the requestor; otherwise, sending the requestor the real identity and location information of the target UE.

* * * * *

UNITED STATES PATENT AND TRADEMARK OFFICE
CERTIFICATE OF CORRECTION

PATENT NO. : 7,623,874 B2 Page 1 of 1
APPLICATION NO. : 11/488444
DATED : November 24, 2009
INVENTOR(S) : Xiaoqin Duan It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 658 days.

Signed and Sealed this

Twenty-sixth Day of October, 2010

David J. Kappos
*Director of the United States Patent and Trademark Office*